May 11, 1954

J. PAYZANT 2,678,222

DRAWBAR LOCK

Filed Sept. 24, 1951

INVENTOR.
JOHN PAYZANT
BY Arthur H. Sturges
Attorney.

Patented May 11, 1954

2,678,222

UNITED STATES PATENT OFFICE 2,678,222

DRAWBAR LOCK

John Payzant, Rogers, Nebr.

Application September 24, 1951, Serial No. 248,052

2 Claims. (Cl. 280—474)

This invention relates to agricultural machinery particularly of the type drawn by tractors, and in particular an improved hitch for attaching farm implements and the like to a tractor and in which detent means is provided for restricting side sway of an implement being towed.

The purpose of this invention is to provide means for limiting lateral travel of a draw-bar connecting a vehicle or implement to a tractor in which the limiting means is readily releasable to facilitate turning corners and also for turning at the end of a row.

In numerous instances where a tractor is pulling an implement or vehicle across a field side sway develops in the coupling members and at times it is necessary to stop the vehicles and make a new start. Various types of attachments and other devices have been used in combination with hitches and draw-bars in attempts to overcome this side sway, however these devices are difficult to mount on the vehicles and they are not readily disconnected to facilitate turning.

With this thought in mind this invention contemplates a frame in the form of a latch positioned over a draw-bar of a tractor and in which the draw-bar extends through a slot in a hinged member that may readily be elevated to release the draw-bar when it is desired to make a turn.

The object of this invention is, therefore, to provide means for forming a guard or latch member that is adapted to be mounted on a tractor which is positioned to hold the draw-bar of the tractor to prevent lateral movement of the draw-bar and which may readily be actuated to release the draw-bar for turning.

Another object of the invention is to provide a draw-bar lock which prevents lateral movement of the draw-bar and at the same time permits a towed vehicle to be pivotally connected to the draw-bar.

Another object of the invention is to provide an improved hitch including a draw-bar in which means is provided for limiting lateral movement of the draw-bar, which may readily be installed on tractors now in use without changing the parts thereof.

A further object of this invention is to provide a tractor draw-bar latch which holds a draw-bar to prevent lateral travel thereof in which the latch may be set by an operator on the seat of the tractor so that it will drop into locking position with the draw-bar when the draw-bar arrives in the center position in alignment with the longitudinal axis of the tractor.

A still further object of the invention is to provide a readily releasable latch for holding the draw-bar of a tractor to prevent lateral movement of the draw-bar which is of a simple and economical construction.

With these and other objects and advantages in view the invention embodies a supporting frame, U-shape in plan, attached to the rear axle housing of a tractor and supported by diagonal braces, a U-shape latch bar having a notch in the lower edge for receiving a draw-bar pivotally mounted on the supporting frame, and a lever attached to the latch bar through a spring for holding the latch bar upwardly out of engagement with the draw-bar when desired.

Other features and advantages of the invention will appear from the following description taken in connection with the drawing, wherein.

Figure 1:
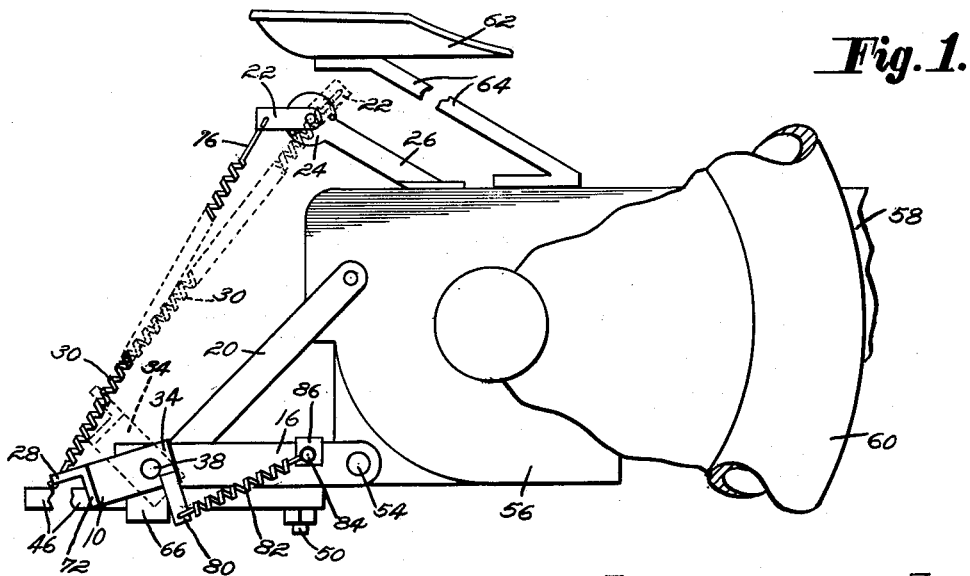
Figure 1 is a side elevational view illustrating the draw-bar latch mechanism and showing the device on the rear axle housing of a tractor with part of a wheel shown thereon and also with a seat positioned on the housing.

Referring now to the drawings wherein like reference characters denote corresponding parts the improved tractor hitch or draw-bar locking latch of this invention includes a latch bar 10, a U-shape mounting frame having a base 12 with side bars 14 and 16, diagonally disposed braces 18 and 20, and a releasing lever 22 pivotally mounted in an eye 24 on the end of an arm 26, and connected to a clip angle 28 on the latch bar 10 by a spring 30.

Figure 4:
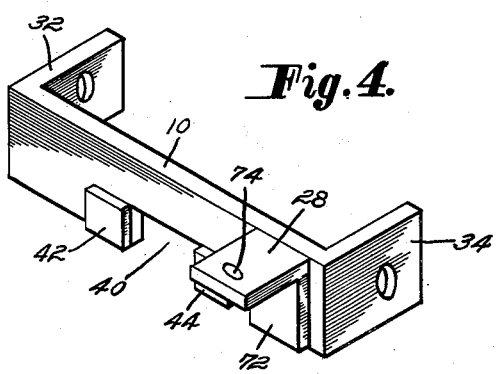
Figure 4 is a detail illustrating the design of the latch bar.

The latch bar 10, which is shown in detail in Figure 4, is provided with flanges 32 and 34 at the ends by which it is pivotally mounted on the side bars 14 and 16 of the mounting frame with bolts 36 and 38. The lower edge of the latch bar is provided with a notch 40 which is positioned midway of the ends thereof, and reinforcing blocks 42 and 44 are positioned at the ends of the notch.

Figure 2:
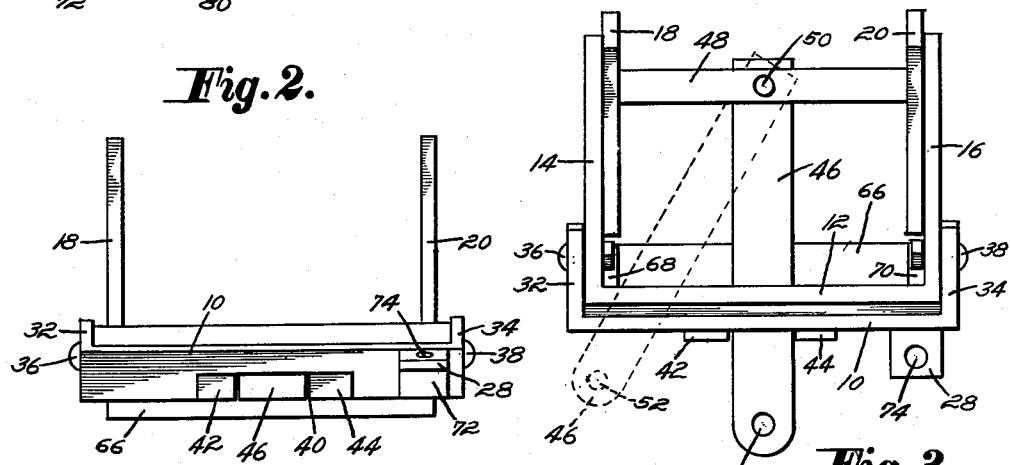
Figure 2 is an end elevational view of the latch bar and mounting instrumentalities thereof.

The notch 40 is positioned to receive a draw-bar 46 with the draw-bar located on the longitudinal center or axis of a tractor on which the device is mounted whereby the draw-bar is locked in the straight ahead position when the latch bar is in the downwardly disposed position as shown in Figures 1 and 2.

The draw-bar is pivotally mounted on a cross bar 48 by a pin 50 and the extended end of the draw-bar is provided with an opening 52 through which a vehicle may be attached to the draw-bar. The brace bar 48 is mounted on the side bars 14 and 16 of the mounting frame and the side bars are provided with openings 54 by which they are attached to the rear axle housing 56 of a tractor 58. The tractor is provided with wheels 60 and a seat 62 is mounted on the housing 56 by a brace 64.

The mounting frame is also provided with a lower cross bar 66 which provides a rest for the extended end of the draw-bar and the ends of the bar 66 are secured by upwardly extended flanges 68 and 70 to the side bars 14 and 16.

The lower leg 72 of the clip angle 28 is secured, preferably by welding to the latch bar 10, and the extended end of the clip angle is provided with an opening 74 through which the lower end of the spring 30 is attached to the clip angle and latch bar. The upper end of the spring is provided with a straight section or rod 76 by which it is connected to the lever 22 thereby providing a handle by which the operator of the tractor may flip the lever over to the position shown in dotted lines in Figure 1 when it is desired to raise the latch bar to release the draw-bar.

Figure 3:
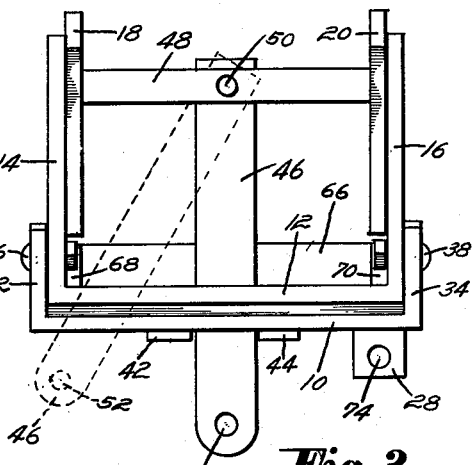
Figure 3 is a plan view of the latch bar mounting showing the draw-bar in full lines in the locked position, and in dotted lines in a released or laterally disposed position.

By this means the operator of the tractor may, while remaining in the seat of the tractor, release the draw-bar when turning in a corner, or at the end of a row, and after making the turn the operator may flip the lever back so that the latch bar drops upon the draw-bar and as soon as the draw-bar returns to the straight ahead or center position the latch bar drops with the notch 40 over the draw-bar whereby the draw-bar is locked in the position shown in Figure 3, in full lines.

With the draw-bar held in this manner it is possible to accomplish better work particularly when using a wide disc which pulls with greater force on one side than on the other, as this uneven pull causes whipping and side sway that makes continued operation difficult. Making it possible to release the draw-bar in turning reduces wear on the tires and brakes, and also reduces fuel consumption and wear in the motor parts.

During traveling movements over rough terrain means may be included for preventing the lock from bouncing out of engagement and said means as shown in Figure 1 include a downwardly extending tang 80, one end of which is welded to the member 10 and a spring 82 one end of which is attached to the member 80 and the other end to a bolt 84 of a clamp 86 which is mounted on the member 16.

From the foregoing description it is thought to be obvious that a draw-bar latch constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a draw-bar latch, the combination which comprises a U-shape mounting frame having a transversely disposed base with longitudinally disposed side bars extended from the ends of the base, said mounting frame having cross bars connecting the side bars, the extended ends of said side bars adapted to be attached to a rear axle housing of a tractor, diagonally disposed braces extended from said side bars and also adapted to be attached to the rear axle housing of a tractor, a draw-bar pivotally mounted on a cross bar connecting the extended ends of the side bars, said draw-bar positioned to slide on another of said cross bars of the mounting frame and having an end extended from the base of said frame, a U-shape latch bar having a notch in the lower edge pivotally mounted on said mounting frame and positioned with the notch over the draw-bar with the draw-bar positioned on the longitudinal center of the mounting frame, an arm also adapted to be mounted on the rear axle housing of the said tractor, a trip lever pivotally mounted in said arm, and a spring connecting said trip lever to the said latch bar for retaining said latch bar in an upwardly disposed position whereby the draw-bar is released from said notch of the latch bar.

2. A draw-bar latch comprising a mounting frame, U-shape in plan having a transversely disposed base with longitudinally disposed side bars and with cross bars connecting the lower edges of the side bars, a draw-bar pivotally mounted on one of the cross bars of the frame and positioned to slide laterally on another of said cross bars, a latch bar having a notch in the lower edge pivotally mounted on the mounting frame and positioned with the draw-bar in said notch with the draw-bar positioned in the center of said mounting frame, resilient means for holding the latch bar in the downward position wherein the draw-bar is retained in said notch, a trip lever for retaining said latch bar in an upwardly disposed position whereby the draw-bar is released from the notch of said latch bar, an arm in which said trip lever is pivotally mounted, and a spring connecting the trip lever to the latch bar.

References Cited in the file of this patent

UNITED STATES PATENTS

| Number | Name | Date |
| --- | --- | --- |
| 1,287,727 | Miller | Dec. 17, 1918 |
| 1,838,865 | Paul | Dec. 29, 1931 |
| 2,472,905 | Kass | June 14, 1949 |
| 2,534,109 | De Witt | Dec. 12, 1950 |